United States Patent [19]

Tanaka et al.

[11] Patent Number: 5,658,841
[45] Date of Patent: Aug. 19, 1997

[54] COMPOSITE CATALYST CONTAINING PHOTOCATALYST DISPERSED IN ALKALI METAL SILICATE MATRIX

[75] Inventors: Keiichi Tanaka, Ryugasaki; Teruaki Hisanaga, Ushiku; Yin Sheng Chen, Tsukuba, all of Japan

[73] Assignee: Director-General of Agency of Industrial Science and Technology, Japan

[21] Appl. No.: 604,564

[22] Filed: Feb. 21, 1996

[30] Foreign Application Priority Data

May 25, 1995 [JP] Japan .................................. 7-126324

[51] Int. Cl.⁶ .............................. B01J 21/06; B01J 23/16
[52] U.S. Cl. ...................... 502/305; 502/242; 502/349; 502/350; 502/254
[58] Field of Search ...................... 502/242, 305, 502/349–350, 254

[56] References Cited

U.S. PATENT DOCUMENTS

| | | | |
|---|---|---|---|
| 4,632,911 | 12/1986 | Goldstein | 502/62 |
| 4,861,484 | 8/1989 | Lichtin et al. | 210/638 |
| 5,480,524 | 1/1996 | Oste | 204/158.2 |

*Primary Examiner*—Glenn A. Caldarola
*Assistant Examiner*—Nadine Preisch
*Attorney, Agent, or Firm*—Lorusso & Loud

[57] ABSTRACT

A composite catalyst having a substrate, and a catalytic layer supported on the substrate and including 100 parts by weight of particles of a photocatalyst dispersed in 6–32 parts by weight of a matrix of an alkali metal silicate.

8 Claims, No Drawings

COMPOSITE CATALYST CONTAINING PHOTOCATALYST DISPERSED IN ALKALI METAL SILICATE MATRIX

BACKGROUND OF THE INVENTION

This invention relates to a supported photocatalyst and a method for the catalytic photoreaction of a photodecomposable reactant.

Photocatalysts such as titanium oxide and zirconium oxide are known to be effective for decomposing a harmful organic compound or $NO_x$ into harmless substances by irradiation with an actinic radiation such as UV light. Since such photocatalysts are in the form of fine powder, however, it is difficult to recover the catalysts from the reaction mixture.

To cope with this problem, a method is proposed in which the powder catalyst is fixed to a suitable support with a binder resin. The binder resin is, however, susceptible to photodecomposition or photooxidation so that the service life of the composite catalyst is not satisfactory. Moreover, since the surface of the catalyst is coated with the binder resin, the catalytic activity is lowered.

SUMMARY OF THE INVENTION

It is, therefore, an object of the present invention to provide a supported photocatalyst having a long service life and a high activity.

Another object of the present invention is to provide catalytic photoreaction method which can effectively decompose a harmful reactant into harmless substances in an economical manner.

In accomplishing the foregoing objects, there is provided in accordance with the present invention a composite catalyst which comprises a substrate, and a catalytic layer supported on the substrate and including 100 parts by weight of particles of a photocatalyst dispersed in 6–32 parts by weight of a matrix of an alkali metal silicate.

In another aspect, the present invention provides a catalytic reaction method which comprises irradiating a fluid containing a photodecomposable reactant with an actinic radiation in the presence of the above composite catalyst.

Other objects, features and advantages of the present invention will become apparent from the detailed description of the preferred embodiment of the invention to follow.

DETAILED DESCRIPTION OF THE PREFERRED EMBODIMENTS OF THE INVENTION

The supported catalyst according to the present invention is composed of a substrate and a catalytic layer supported on the substrate and including 100 parts by weight of particles of a photocatalyst dispersed in 6–32 parts by weight, preferably 10–20 parts by weight, of a matrix of an alkali metal silicate.

The substrate may be in any desired form such as a plate, a ball, particles, a cylinder, a fiber, a fabric, a bar, a block and may be formed of a metal, a ceramic, a glass, an organic polymeric material or any other desired material.

The photocatalyst used for the purpose of the present invention is preferably an inorganic oxide, such as titanium oxide, zinc oxide, zirconium oxide and tungsten oxide, having an average particle diameter of 0.01–2 µm, more preferably 0.1–0.5 µm.

The photocatalyst particles are supported on the substrate using an alkali metal silicate as a binder. Illustrative of suitable alkali metal silicates are sodium silicate, potassium silicate and lithium silicate. These silicates may be used by themselves or a mixture of two or more. Water glass is advantageously utilized as the binder.

The supported catalyst of the present invention may be prepared as follows.

An aqueous solution containing the alkali metal silicate binder is first mixed with the photocatalyst particles to obtain a coating liquid preferably having a photocatalyst particle concentration of 20–70% by weight, more preferably 50–60% by weight. If desired, an alcohol or other organic solvent such as methanol or ethanol may be incorporated into the aqueous coating liquid.

The coating liquid is then applied to the substrate by any known method such as immersion, spray coating, roll coating or brush coating. The coating may be performed at room temperature or, if desired, up to 50° C. The coated layer is thereafter hardened to obtain a catalyst layer supported on the substrate in which layer the photocatalyst particles are dispersed in a matrix of the alkali metal silicate. The catalyst layer has preferably a thickness of about 100–500 µm.

The hardening of the coated layer may be preferably carried out by drying the layer at a temperature of 100°–150° C., more preferably 110°–130° C. for 0.5–3 hours. Thereafter, the dried layer is sintered at a temperature of 400°–500° C. to obtain the hardened layer.

Alternatively, the hardening of the coated layer may be performed by incorporating a hardener into the coating liquid. The coated liquid is hardened at room temperature or at an elevated temperature of up to about 80° C. The hardened layer may be further sintered at a temperature of 400°–500° C., if desired. The hardener may be, for example, an inorganic acid or salt thereof such as phosphoric acid or boric acid; silicofluoride such as sodium silicofluoride; a metal oxide such as zinc oxide or magnesium oxide; or a metal salt such as calcium carbonate or calcium sulfate. The hardener is generally used in an amount of 10–25% by weight based on the weight of the alkali metal silicate.

By contacting a fluid containing a photodecomposable reactant with the above supported catalyst under the irradiation with an actinic radiation, the reactant is decomposed or oxidized. The actinic radiation may be, for example, UV light or near UV light. A low pressure mercury lamp, a high pressure mercury lamp, a xenon lamp, a black lamp or a tungsten lamp may be suitably used as a source of the actinic radiation. Sunlight is also utilizable. Illustrative of the photodecomposable reactants are aromatic compounds such as phenol compounds and aromatic hydrocarbons; organic halogenated compounds; and $NO_x$. Thus, the method of the present invention is suitably applied to the treatment of a waste liquid containing surfactants, agricultural chemicals or the like polluting substances or a waste gas containing $NO_x$.

The following examples will further illustrate the present invention.

EXAMPLE 1

A commercially available glass water (0.09 g) containing 52–57% by weight of sodium silicate was mixed with 2 g of purified water to form a uniform liquid, to which 0.45 g of titanium dioxide (anatase-type titanium dioxide TP-2 manufactured by Fuji Titanium Inc.) was homogeneously mixed. The mixture was then uniformly applied onto a glass plate (size: 45 mm×40 mm×1 mm). The glass plate having the coated layer was dried at room temperature for 40 minute and at 120° C. for 3 hours and, thereafter, sintered at 500° C. for 1 hour in an electric oven, thereby obtaining a supported catalyst having a titanium dioxide catalyst layer (thickness: 200 μm) supported on the glass plate.

The supported catalyst was placed in a rectangular parallelopiped cell (size: 48 mm×47 mm×10 mm) made of a pylex glass, into which 15 ml of an aqueous solution containing 45.8 ppm ($2\times10^{-4}$ mole/liter) of picric acid was poured. The cell was then irradiated with a light from 500 W super-high pressure mercury lamp through a water filter (thickness: 100 mm). It was found that about 75% of the picric acid was decomposed after 1 hour irradiation and substantially all of the picric acid was decomposed after 2 hour irradiation. The above procedure was repeated 5 times using fresh aqueous picric acid solution. No separation of the catalyst layer was observed.

EXAMPLE 2

Example 1 was repeated in the same manner as described except that the time for the drying at 120° C. was reduced to 30 minutes. It was found that about 57% of the picric acid was decomposed after 1 hour irradiation and about 80% of the picric acid was decomposed after 2 hour irradiation. The reaction mixture was discharged and the cell was washed well with purified water. A fresh picric acid solution was then charged in the cell and irradiation was carried out in the same manner. Similar results were obtained. No separation of the catalyst layer was observed.

EXAMPLE 3

A supported catalyst was prepared in the same manner as that in Example 1 except that the time for the drying at 120° C. was reduced to 90 minutes. The supported catalyst was tested for the catalytic performance using an aqueous solution containing 18.8 ppm ($2\times10^{-4}$ mole/liter) of phenol in the same manner as that in Example 1. It was found that about 53% of the phenol was decomposed after 30 minutes irradiation and 73% of the phenol was decomposed after 1 hour irradiation. No separation of the catalyst layer was observed.

EXAMPLE 4

One of the four inside side surfaces of a quartz glass cell (size: 5mm×5 mm×10 mm) was coated with the same titanium dioxide mixture as used in Example 1. The coat was dried at room temperature for 40 minutes and then at 120° C. for 3 hours and, thereafter, sintered at 500° C. for 1 hour in an electric oven, thereby obtaining a supported catalyst having a titanium dioxide catalyst layer (thickness: 400 μm) supported on the quartz glass cell. Into the thus obtained cell was charged an air containing 10.833 ppm (0.486 mmol/liter) of benzene vapor and the cell was closed with a lid provided with a septum. Using a 40 W lower pressure mercury lamp having a synthetic quartz tube, the side wall of the cell having the catalyst layer was irradiated a distance of 55 mm away from the lamp. The benzene content was reduced to 1.6 ppm after the 20 minutes irradiation and became 0 after 50 minutes irradiation. The gas chromatography revealed that 68% of the benzene was converted into carbon dioxide. Neither separation nor fouling of the catalyst layer was observed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A composite catalyst comprising a substrate, and a catalytic layer supported on said substrate, said catalytic layer including (a) 100 parts by weight of particles of a photocatalyst dispersed in (b) 6–32 parts by weight of a matrix of an alkali metal silicate.

2. A composite catalyst as claimed in claim 1, wherein said photocatalyst is an inorganic oxide selected from the group consisting of titanium oxide, zinc oxide, zirconium oxide and tungsten oxide.

3. A composite catalyst as claimed in claim 1, wherein said photocatalyst has an average particle diameter of 0.01–2 μm.

4. A composite catalyst as claimed in claim 1, wherein said alkali metal silicate is dried water glass.

5. A catalytic reaction method comprising irradiating a fluid containing a photodecomposable reactant with an actinic radiation in the presence of a composite catalyst according to claim 1.

6. A composite catalyst as claimed in claim 1 formed from a dispersion of said particles of said photocatalyst dispersed in an aqueous solution of said alkali metal silicate.

7. A composite catalyst as claimed in claim 1 wherein said alkali metal silicate is water-soluble.

8. A composite catalyst as claimed in claim 1 wherein said alkali metal silicate is selected from the group consisting of sodium silicate, potassium silicate and lithium silicate.

* * * * *